United States Patent
Shieh

[11] 3,908,138
[45] Sept. 23, 1975

[54] STATOR CORE AND ARMATURE CORE FOR A VIBRATING MOTOR

[75] Inventor: Ming K. Shieh, Westerville, Ohio

[73] Assignee: Dresser Industries, Inc., Dallas, Tex.

[22] Filed: Apr. 8, 1974

[21] Appl. No.: 458,573

[52] U.S. Cl............... 310/29; 29/596; 198/220 DC
[51] Int. Cl.² ......................................... H02K 33/00
[58] Field of Search............ 310/29, 28, 17, 15, 31, 310/32, 43, 27, 25; 198/220 DC; 29/596

[56] References Cited
UNITED STATES PATENTS

| | | | |
|---|---|---|---|
| 2,425,621 | 8/1947 | Knipper | 310/27 |
| 2,479,589 | 8/1949 | Parker | 29/596 X |
| 2,774,000 | 12/1956 | Ross | 310/216 |
| 3,020,425 | 2/1962 | Steiner | 310/28 X |
| 3,764,834 | 10/1973 | Brosch et al. | 310/29 X |
| 3,803,431 | 4/1974 | Inaba et al. | 310/216 X |

FOREIGN PATENTS OR APPLICATIONS

| | | | |
|---|---|---|---|
| 974,963 | 5/1961 | Germany | 310/29 |

Primary Examiner—Donovan F. Duggan
Attorney, Agent, or Firm—David Young; John M. Lorenzen

[57] ABSTRACT

A vibrating motor with a stator and an armature, in which the stator and the armature are formed from an endless core element. The endless core element is made by winding a band of magnetically permeable material upon itself. The endless core element is then cut into two complementary parts, one of which forms the stator core and the other forms the armature core.

9 Claims, 5 Drawing Figures

STATOR CORE AND ARMATURE CORE FOR A VIBRATING MOTOR

BACKGROUND OF THE INVENTION

1. Field of the Invention

This invention relates to vibrating motors, and more particularly to a novel stator core and armature core for vibrating motors.

2. Description of the Prior Art

The vibrating motors to which this invention relates are characterized by a main frame and a center clamp, with a stack of vibrator bars interposed between the main frame and the center clamp. The opposite ends of the vibrator bars are fixedly secured to the main frame, and the center clamp is fixedly secured to the vibrator bars at a position intermediate the opposite ends thereof. The stack of vibrator bars secured in this manner to the main frame and to the center clamp constitutes the flexible element in the vibrating motor, which permits the relative vibratory movement of the main frame and the center clamp.

In the main frame there is a stator which is an electromagnet that is alternately energized and deenergized. In the center clamp there is an armature that is disposed opposite the stator, with a small air gap between the stator and the armature. When the stator is energized, the armature and the center clamp are drawn toward the stator, flexing the vibrator bars in the direction of the stator. When the stator is de-energized, the armature and the center clamp are released, whereby the vibrator bars are permitted to spring back and flex in the opposite direction. Such alternate flexing action of the spring bars produces the vibration of the main frame and the center clamp relatively to each other.

In a typical construction of the vibrating motor, the main frame is made as the heavy element, which is relatively heavier than the center clamp and the working part to which the center clamp is attached. A typical use of a vibrating motor is for a vibrating feeder in which there is a feeding trough attached to the center clamp, and this feeding trough, with the material that is in the trough, then becomes part of the vibrating mass.

It has been customary to make such vibrating motors of flat laminations which are stacked to form the stator and the armature. In the stator, each of the flat laminations has a horsehoe configuration to form two poles in the stator, and an electrical coil is mounted on each pole. A sufficient number of laminations is stacked to form the stator to the desired thickness, and these are then secured by a plurality of screw bolts which extend through the laminations to secure these together in the stator, it being desired that such laminations lay flat against each other in abutting relation. The through bolts also secure the stator to the main frame.

The armature is similarly formed of a plurality of flat laminations which are of an elongated form to extend across the two poles of the stator. The armature is formed of a stack of such laminations of sufficient number to form the armature of the same thickness as the stator. The armature laminations are secured by a plurality of through bolts which extend through the laminations to hold them in the assembly tightly stacked against each other in abutting relation. The through bolts also secure the armature to the center clamp.

Such a typical construction of a vibrating motor is illustrated in the patent to Flint, U.S. Pat. No. 2,094,785, issued Oct. 5, 1937, for Vibratory Conveyor. In the vibrating motor which is illustrated in this patent, the mode of operation is that the coils which are on the poles of the stator are alternately energized and de-energized. The stator laminations are made of magnetically permeable material, and the stator is alternately magnetized and demagnetized as the coils are energized and de-energized, respectively. The armature is separated from the poles of the stator by a small air gap, and is formed of laminations made of magnetically permeable material. As the stator is magnetized, the armature is drawn toward the stator poles, and when the stator is de-magnetized, the armature is released, thereby producing the vibrating action of the motor by the vibrator bars which are interposed between the main frame and the center clamp.

In such vibrating motor construction, the respective through bolts in the stator and in the armature are relied upon to hold the laminations of the stator and of the armature in assembled abutting relation in the main frame and in the center clamp, respectively. This construction requires that the laminations be in as near flat condition as possible to maintain the close abutting relation of the laminations in order to produce the best operation that is possible with this type of construction. However, it is possible for the laminations to become slightly separated, which causes noise and losses in the magnetic operation of the stator and the armature with a resulting loss of efficiency of operation. Another drawback is that there are eddy currents generated in the through bolts by reason of the encircling magnetic flux, thereby generating heat and causing further loses in the operation of the stator and the armature.

SUMMARY OF THE INVENTION

In accordance with this invention, the stator and the armature of the vibrating motor are formed from an endless core element. This endless core element is formed by winding a band of permeable material upon itself to the desired size and shape of the endless core element. This winding is preferably made on a central mandrel, and the successive windings of the band of material build up the core element to the desired thickness.

In the preferred construction of the core element, it is wound on a mandrel of a rectangular cross-section, thereby forming a rectangular central opening in the finished wound core element. The core element that is formed in this manner is then cut at right angles to the long axis of the central rectangular opening, and the cut is made closer to one end of the rectangular opening then to the other end. The two complementary parts of the core element that are so formed provide one core for the stator, which is of a horseshoe configuration with legs on which electrical coils may be mounted for energizing the stator, thereby producing the magnetic force. The other complementary part of the core element is then used for the armature core, and in the vibrating motor the armature core is placed opposite the legs or poles of the stator core.

In order to achieve optimum magnetic performance of the vibrating motor, the core element may be formed of grain oriented magnetic iron-silicon alloy to achieve a very high permeability and low core loss in the stator core and the armature core. By continuously winding the band of material in the core element, the direction of magnetic flux in the stator core and in the armature core coincides with the best magnetic direction of the material for optimum efficiency.

It is accordingly an object of this invention to provide an improved vibrating motor with a stator core and an armature core of highly efficient operation.

It is another object of this invention to provide an improved vibrating motor having a stator core and an armature core with a very high permeability and a low core loss.

It is a further object of this invention to provide an improved vibrating motor in which the stator core and the armature core are formed of grain oriented steel to permit operation of the vibrating motor at a higher flux density, and less generation of heat than would be otherwise possible.

It is also an object of this invention to provide an improved vibrating motor in which the stator core and the armature core are complementary parts of an endless core element that is cut to form such complementary parts.

It is still another object of this invention to provide an improved vibrating motor in which the stator core and the armature core are formed from an endless core element that is made by winding a band of permeable material upon itself to the desired size and shape of the endless core element.

It is yet another object of this invention to provide an improved vibrating motor in which the stator core and the armature core are formed of grain oriented permeable material in which the direction of magnetic flux coincides with the best magnetic direction of the material.

Still a further object of the invention is to provide an improved vibrating motor in which the stator core and the armature core are formed of windings of permeable material that are wound closely upon each other to maintain the windings in contiguity in the assembly of the stator and the armature, respectively, for optimum magnetic operation of the vibrating motor.

Other objects of the invention will appear hereinafter, the novel features and combinations being set forth in the appended claims.

DESCRIPTION OF THE PREFERRED EMBODIMENT

Figure 1:
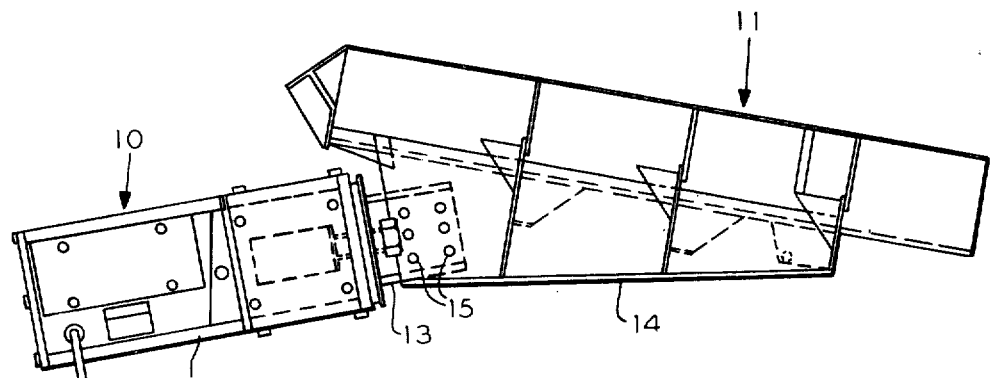
FIG. 1 is a side elevational view of a vibrating feeder, which includes a vibrating motor attached to a feeding trough.

There is illustrated in FIG. 1 a vibrating feeder comprising a vibrating motor 10 and a feeding trough 11. The vibrating motor 10 has a main frame 12 and a center clamp 13, the latter being secured to the feeding trough 11. There is a sub-frame 14 on the underside of the feeding trough 11, and the center clamp 13 extends into the sub-frame 14 and is secured to the latter by a plurality of bolts 15, 15.

Figure 2:
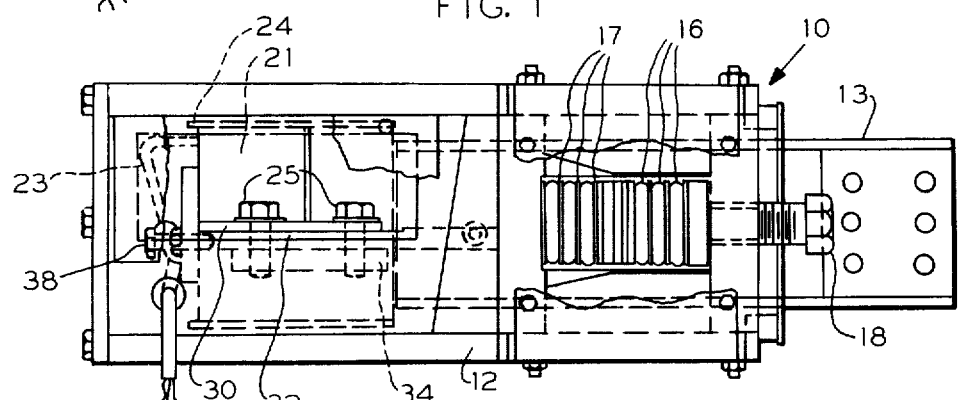
FIG. 2 is a side elevational view of the vibrating motor of FIG. 1, with the side of the vibrating motor being partially open.
Figure 3:
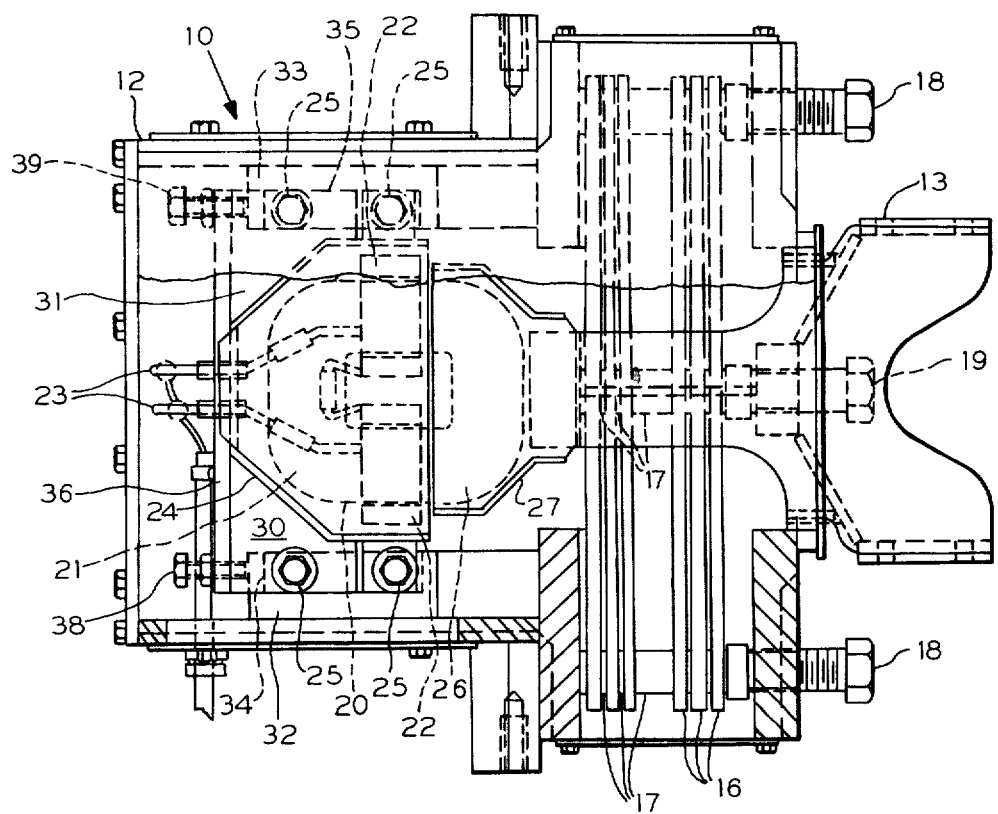
FIG. 3 is a plan view of the vibrating motor illustrated in FIG. 2, with the top of the vibrating motor being partially open.

There is a more detailed illustration of the vibrating motor 10 in FIGS. 2 and 3. The main frame 12 and the center clamp 13 are connected by a plurality of vibrator bars 16, 16 which are arranged in a stack with suitable spacer elements 17, 17 between the individual vibrator bars 16, 16. The spacer elements 17, 17 provide suitable spacing between the individual vibrator bars 16, 16 to permit these to flex back and forth to provide the vibrating action of the main frame 12 and the center clamp 13 relatively to each other.

The opposite ends of the vibrator bars 16, 16 are fixedly secured in the main frame 12 by locking screws 18, 18 at opposite sides of the main frame 12, that are turned down against the vibrator bars 16, 16 with the spacers 17, 17 therebetween. The center clamp 13 is secured to the stack of vibrator bars 16, 16 at a position midway between the ends thereof, and the center clamp 13 is fixedly secured to the vibrator bars 16, 16 by a locking screw 19 which is turned down against the vibrator bars 16, 16 with suitable spacer elements 17, 17 therebetween.

In the main frame 12 there is a stator 20 which comprises a core 21 made of magnetically permeable material, and coils 22, 22 on the poles of the stator core 21. The coils 22, 22 are alternately energized to magnetize the core 21 of the stator 20, and de-energized to demagnetize the core 21 of the stator 20. Current is supplied to the coils 22, 22 through electrical leads 23, 23. The stator 20 is contained within a housing 24 that is secured in the main frame 12 by a plurality of bolts 25, 25 on opposite sides of the main frame 12.

The center clamp 13 has an armature core 26 which is disposed opposite the stator core 21 with a small air gap therebetween, as best seen in FIG. 3. The armature core 26 is made of magnetically permeable material so as to be attracted to the stator 20 when it is magnetized, and released from the stator 20 when it is demagnetized. The armature core 26 is disposed within a housing 27 formed at the rear end of the center clamp 13.

When the armature core 26 is attracted to the stator 20 the vibrator bars 16, 16 are flexed in the direction of the stator 20. When the armature core 26 is released from the stator 20 the vibrator bars 16, 16 are free to flex in the opposite direction. Such alternate action of the stator 20 and the armature core 26 produces the back and forth flexing movement of the vibrator bars 16, 16 in the vibrating motor 10. This, in turn, produces the relative vibrating movement of the main frame 12 and the center clamp 13. The main frame 12 is made as a relatively heavier element than the center clamp 13, whereby the principal vibrating movement manifests itself in the center clamp 13 and the working element which is attached to the latter, which may be a feeding trough 11 of a vibrating feeder. By the vibrating movement of the feeding trough 11 the material which is delivered to the feeding trough 11 is regularly fed along the length thereof and discharged from the open end of the feeding trough 11.

The stator housing 24 has a laterally extending rib 30 at one side, and a similar laterally extending rib 31 at the opposite side. The main frame has shelves 32, 33. The ribs 30, 31 overlie the shelves 32, 33. The bolts 25, 25 extend through the rib 30 and the shelf 32, and are threaded into a plate 34 under the shelf 32. Similarly, the bolts 25, 25 at the other side of the main frame 12 extend through the rib 31 and through the shelf 33, and are threaded into a plate 35 that lies under the shelf 33. By tightening the respective bolts 25, 25, the plates 34, 35 are drawn up against the underside of the respective shelves 32, 33 and securely hold the stator housing 24 in adjusted position. The shelves 32, 33 are formed with elongated holes for the bolts 25, 25 so that there is some adjustment available of the position of the stator housing 24 by sliding the latter along the shelves 32, 33. The stator housing 24 has a back plate 36 which is secured to the ribs 30, 31. A bolt 38 is threaded through the back plate 36 at one side of the stator housing 24, and a bolt 39 is threaded through the back plate 36 at the opposite side of the stator housing 24. The bolts 38, 39 extend through the back plate 36 and abut the edges of the shelves 32, 33 and are used for adjusting the position of the stator housing 24 along the shelves 32, 33. The adjustment of the position of the stator housing 24 is used for setting the width of the air gap between the stator 29 and the armature core 26. The magnetic force of the stator 29 on the armature core 26 is a function of the air gap therebetween.

Figure 4:
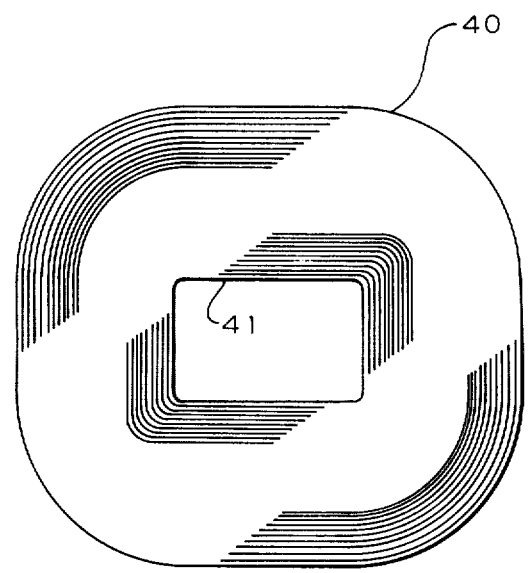
FIG. 4 illustrates the wound core element.
Figure 5:
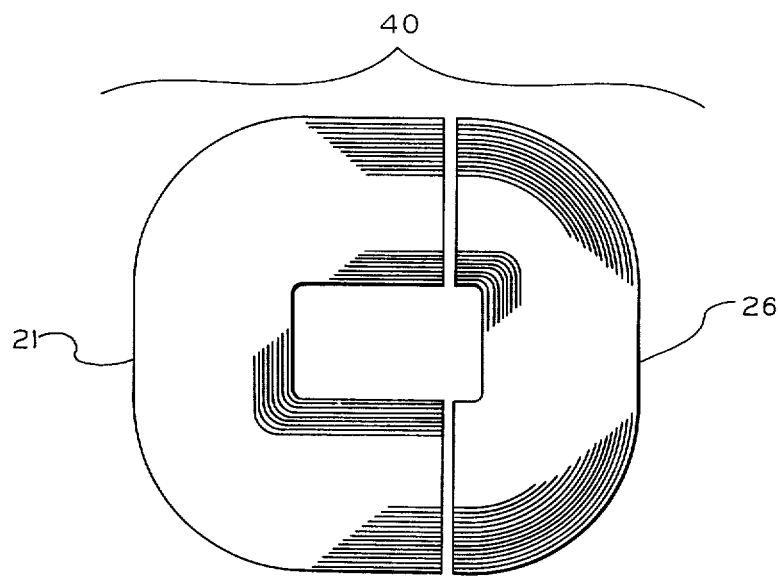
FIG. 5 illustrates the complementary parts of the core element which form the stator core and the armature core of the vibrating motor.

The stator core 21 and the armature core 26 are formed from the endless core element illustrated in FIG. 4. The endless core element is formed from a band of magnetically permeable material of the desired width which is wound upon a mandrel. The mandrel is preferably of a rectangular shape to thereby form the rectangular central opening 41. As the band of material is wound, the corners assume an increasingly circular shape until in the final endless core element 40 the corners are decidedly circular. As a consequence of being formed from the winding of a band of material, the endless core element has concentric layers or laminations of the magnetically permeable material extending from the central opening 41 to the periphery of the core element 40.

The first step in making the endless core element 40 is to slit the magnetically permeable material to the desired width, which establishes the lateral dimension of the core element 40. This provides the band of material which is then wound on the form or mandrel of the desired shape which is in this case of a rectangular section. The core element 40 is then annealed to relieve the stresses that are set up in the slitting and winding, and the core element is then bonded in a resin or similar material to hold the layers of the band of material together in contiguity to each other, which is desired for optimum magnetic operation of the stator core 21 and the armature core 26, which are to be formed from the core element 40. In making the core element 40 it is preferred to use a grain oriented magnetic iron-silicon alloy which has a very high magnetic permeability and a low core loss. When the band is continuously wound into the core element as illustrated, the direction of magnetic flux coincides with the best magnetic direction of the material for optimum operation.

The stator core 21 and the armature core 26 are formed from the core element 40 by making a cut through the core element 40 at right angles to the long axis of the rectangular opening 41. The cut is made closer to one end of the rectangular opening 41 than to the other end. The cut exposes the ends of the layers of the magnetically permeable material in the core element 40, and these are chemically etched to remove the burrs, and thereby to avoid shorting between the respective layers in the stator core 21 and in the armature core 26. The stator core 21 so formed has legs on which the electrical coils 22, 22 may be mounted, and the complementary part of the core element 40 forms the armature core 26.

The stator core is assembled in the stator housing 24 and the armature core 26 is assembled in the armature housing 27 by encapsulating the cores in the respective housings. The encapsulation is accomplished by filling the stator housing 24 and the armature housing 27 with encapsulating material which completely surrounds the stator core 21 and the armature core 26. Such encapsulating material is preferably an epoxy resin of a thermosetting type which may be poured into the housing, and then sets up in a hard condition to firmly hold the stator core 21 and the armature core 26 in the respective housings 24, 27. Such encapsulating prevents separation of the layers of the stator core 21 and of the armature core 26.

The vibrating motor constructed in accordance with this invention is considerably more efficient than prior constructions. This greater efficiency derives from the novel construction of the stator core 21 and the armature core 26 from the endless core element 40. It is possible to develop greater magnetic forces which permits operation with a larger air gap than would otherwise be available, which, in turn, produces a longer stroke of the vibrating feeder. This permits the feeding of material at a greater rate than would otherwise be possible.

Obviously, those skilled in the art may make various changes in the details and arrangement of parts without departing from the spirit and scope of the invention as defined by the claims hereto appended, and applicant, therefore, wishes not to be restricted to the precise construction herein disclosed.

Having thus described and shown an embodiment of the invention, what it is desired to secure by Letters Patent of the United States is:

1. In a vibrating motor comprising a stator which can be alternately magnetized and demagnetized and an armature connected to the stator by spring means and disposed opposite the stator such that it is attracted toward the magnetized stator and released by the demagnetized stator to produce vibratory movement of the armature relative to the stator, the improvement wherein the stator includes a core having two magnetic poles and comprised of a plurality of concentric layers of magnetically permeable material extending in a generally horseshoe configuration from pole to pole, and wherein the armature includes a core comprised of a plurality of concentric layers of magnetically permeable material, the layers of said armature core corresponding generally to the layers of said stator core and each extending from end to end of said armature core, the ends of said armature core being disposed in spaced relationship opposite the poles of said stator.

2. A vibrating motor as recited in claim 1, wherein said stator core and armature core are severed complementary sections of a coil formed by winding a band of said permeable material upon itself in a plurality of layers.

3. A vibrating motor as recited in claim 2 in which said continuous band of material is grain oriented to enhance the permeability of the stator core and of the armature core.

4. A vibrating motor as recited in claim 2, wherein the stator core has two parallel legs adjacent its polar ends, and wherein an electrical magnetizing coil is mounted about each leg of the stator core.

5. A vibrating motor as recited in claim 2, wherein said wound coil has a generally rectangular central opening and wherein the stator core is the larger section of said coil when the coil is cut at right angles to the long axis of the rectangular opening and close to one end of the opening, and the armature core is the remaining smaller section.

6. A vibrating motor as recited in claim 1, wherein the armature core is encapsulated in and held together by a hardened resin.

7. A vibrating motor as recited in claim 1, wherein the stator core is encapsulated in and held together by a hardened resin.

8. A vibrating motor as recited in claim 6, wherein the armature includes a housing and the armature core is held in said housing by the encapsulating resin.

9. A vibrating motor as recited in claim 7, wherein the stator includes a housing and the stator core is held in said housing by the encapsulating resin.

* * * * *